(12) United States Patent
Haugland (10) Patent No.: US 7,039,524 B2
(45) Date of Patent: May 2, 2006

(54) SHEAR WAVE VELOCITY DETERMINATION USING MULTI-POLE WAVE

(75) Inventor: Samuel Mark Haugland, Houston, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 61 days.

(21) Appl. No.: 10/783,426

(22) Filed: Feb. 20, 2004

(65) Prior Publication Data

US 2005/0185510 A1 Aug. 25, 2005

(51) Int. Cl.
*G01V 1/28* (2006.01)

(52) U.S. Cl. .................................. 702/6; 702/18

(58) Field of Classification Search ............... 702/6, 702/7, 9, 18; 367/31, 75; 181/106
See application file for complete search history.

(56) References Cited

U.S. PATENT DOCUMENTS

| | | | |
|---|---|---|---|
| 4,698,792 A | 10/1987 | Kurkjian et al. | |
| 4,774,693 A | 9/1988 | Winbow et al. | |
| 4,779,236 A | 10/1988 | Sondergeld | |
| 5,278,805 A | 1/1994 | Kimball | |
| 5,852,262 A | 12/1998 | Gill et al. | |
| 5,886,303 A * | 3/1999 | Rodney .................. | 181/102 |
| 5,936,913 A * | 8/1999 | Gill et al. .................. | 367/25 |
| 6,614,360 B1 * | 9/2003 | Leggett et al. ............ | 340/853.1 |
| 6,631,327 B1 | 10/2003 | Hsu et al. | |
| 6,661,737 B1 | 12/2003 | Wisniewski et al. | |
| 6,671,224 B1 | 12/2003 | Pabon | |
| 6,678,616 B1 | 1/2004 | Winkler et al. | |
| 6,714,480 B1 | 3/2004 | Sinha et al. | |
| 6,766,252 B1 | 7/2004 | Blanch et al. | |
| 6,791,899 B1 | 9/2004 | Blanch et al. | |

OTHER PUBLICATIONS

X. M. Tang, et al., "A dispersive-wave processing technique for estimating formation shear velocity from dipole and Stoneley waveforms," Petrophysics, vol. 60, No. 1 (Jan.-Feb. 1995), pp. 19-28, 9 Figs.

X. M. Tang, et al., "Shear-Velocity Measurements In the Logging-While Drilling Environment: Modeling and Field Evaluations," Petrophysics, vol. 44, No. 2 (Mar.-Apr. 2003), pp. 79-90.

(Continued)

*Primary Examiner*—Donald McElheny, Jr.

(57) ABSTRACT

A method for determining a formation shear wave velocity for a subterranean formation is provided. The method includes propagating a multi-pole acoustic signal in a borehole using an acoustic transmitter and receiving an acoustic waveform from the multi-pole acoustic signal at at least one receiver. The method further includes processing the acoustic waveform to determine a borehole guided wave velocity and processing the borehole guided wave velocity to determine the shear wave velocity of the subterranean formation. Isolation, suppression or enhancement of any particular harmonics of the acoustic signal is not required.

32 Claims, 4 Drawing Sheets

OTHER PUBLICATIONS

G. L. Varsamis, et al, "LWD Shear Velocity Logging in Slow Formations Design Decisions and Case Histories," SPWLA 41st Annual Logging Symposium, Jun. 4-7, 2000, Paper O.

C. H. Cheng and M. N. Toksoz, "Elastic Wave Propagation In A Fluid-Filled Borehole and Synthetic Acoustic Logs," Geophysics, vol. 46, No. 7, Jul. 1981, pp. 1042-1053.

D. P. Schmitt, "Shear Wave Logging in Elastic Formations," J. Acoust. Soc. A., 84(6), Dec. 1988, pp. 2215-2229.

M. T. Taner, F. Koehler, and R. E. Sheriff, "Complex seismic trace analysis," Geophysics, vol. 44, No. 6 (Jun. 199); pp. 1041-1063.

C. H. Cheng and M. Nfi Toksoz, "Determinations Of Shear Wave Velocities In "Slow" Formations," SPWLA 24th Annual Logging Symposium, Jun. 37-30, 1983, Paper V.

Georgios L. Varsamis, et al., "A New MWD Full Wave Dual Mode Sonic Tool Design And Case Histories," SPWLA 40th Annual Logging Symposium, May 30-Jun. 3, 1999, Paper P.

F. El-Wazeer, et al., "Applications For A Full Wave Sonic LWD Tool in the Middle East," Society of Petroleum Engineers 13th Middle East Oil Show & Conference, Apr. 5-8, 2003, SPE 81474.

Jennifer Market, et al., "Processing and Quality Control of LWD Dipole Sonic Measurements," SPWLA 43rd Annual Logging Symposium, Jun. 2-5, 2002, Paper PP.

Chaur-Jian Hsu and Kikash K. Sinha, "Mandrel effects on the dipole flexural mode in a borehole," J. Acoust. Soc. Am. 104(4), Oct. 1998, pp. 2025-2039.

* cited by examiner

SHEAR WAVE VELOCITY DETERMINATION USING MULTI-POLE WAVE

FIELD OF THE INVENTION

The present invention relates generally to analysis of subterranean formations from a bore hole. More particularly, this invention relates to a method for determining a shear wave velocity using a multi-pole wave, such as might be advantageous in analysis of acoustically slow earth formations.

BACKGROUND OF THE INVENTION

The use of acoustic (e.g., audible and/or ultrasonic) measurement systems in prior art downhole applications, such as logging while drilling (LWD), measurement while drilling (MWD), and wireline logging applications is well known. Such acoustic measurement systems are utilized in a variety of downhole applications including, for example, borehole caliper measurements, measurement of drilling fluid properties, and the determination of various physical properties of a formation. In one application, acoustic waveforms may be generated at one or more transmitters deployed in the borehole. The acoustic responses may then be received at an array of longitudinally spaced receivers deployed in the borehole. Acoustic logging in this manner provides an important set of borehole data and is commonly used in both LWD and wireline applications to determine compressional and shear wave velocities (also referred to as slownesses) of a formation.

It will be appreciated that the terms slowness and velocity are often used interchangeably in the art. They will likewise be used interchangeably herein with the understanding that they are inversely related to one another and that the measurement of either may be converted to the other by simple mathematical calculations. Additionally, as used in the art, there is not always a clear distinction between the terms LWD and MWD. Generally speaking MWD typically refers to measurements taken for the purpose of drilling the well (e.g., navigation) whereas LWD typically refers to measurement taken for the purpose of analysis of the formation and surrounding borehole conditions. Nevertheless, these terms are herein used synonymously and interchangeably.

Procedures for determining compressional and shear wave velocities are known in the prior art. In so-called "fast" formations, in which the shear wave velocity in the formation is greater than a compressional wave velocity in the drilling fluid (drilling mud), the compressional and shear wave velocities may be directly determined from the received waveforms by well established techniques. However, in so-called "slow" formations, in which the shear wave velocity of the formation is less than the compressional wave velocity of the drilling fluid, direct determination of the shear wave velocity is typically not possible since the shear waves in the formation do not generally refract back into the borehole. Nevertheless, the shear wave velocity remains an important parameter and its determination is desirable. As such, indirect methodologies have been developed to determine shear wave velocity in acoustically slow formations.

In conventional wireline logging applications, broad bandwidth, dipole logging tools were developed to indirectly measure shear wave velocity in acoustically slow formations. Dipole acoustic waves that travel along the formation (also referred to as flexural waves or first azimuthal order harmonics) are known to asymptotically approach the formation shear wave velocity at low frequencies (e.g., from about 1 to about 3 kHz). Thus, in conventional wireline acoustic logging applications, the formation shear wave velocity may be determined from the low frequency portion of the dipole waveform. A correction may then be applied to account for the adverse effect of residuals. Unfortunately, such dipole logging techniques are not typically suitable for LWD applications owing to potentially significant tool wave interference. In wireline applications, such tool waves may be reduced via various tool configurations, such as slotted sleeves, isolation joints, and flexible tool structures. In LWD, tool waves tend to be carried by the comparatively stiff tool body, which is essentially the drill string, and thus tend not to be easily mitigated. Additionally, the presence of the drill string in the borehole and tool eccentricity in the borehole tends to alter the propagation modes of the acoustic energy. Further, drill bit noise tends to significantly reduce the signal to noise ratio in the low frequency range of interest (where flexural waves travel at about the same velocity as the formation shear waves). As such, deriving formation shear wave velocities from LWD data is not nearly as straightforward as in wireline applications.

In order to overcome such limitations, there is a trend in the art towards attempting to use broadband quadrupole waveforms in LWD applications (see, for example, Tang, et al., in *Petrophysics, vol.* 44, pgs. 79–90, 2003). Such quadrupole waveforms (also referred to as screw waves or second order azimuthal harmonics) have been shown, for some configurations, to have a cut-off frequency below which tool wave propagation is substantially eliminated. It is thus apparent in the prior art that the use of quadrupole acoustic signals may be advantageous for determining shear wave velocities in LWD applications. However, the use of quadrupole waveforms tends to introduce other potential difficulties. For example, generating and receiving a relatively pure quadrupole acoustic signal typically requires complex segmented transmitters and receivers, which tend to be expensive. Such transmitters and receivers typically further require highly precise phasing (timing) of the various segments to produce relatively pure quadrupole acoustic signals and to suppress other modes (e.g., monopole and dipole). The difficulty in generating such acoustic signals may be further exacerbated by tool eccentricity in the borehole (e.g., in highly deviated wells in which the tool is typically lies on the low side of the borehole). Moreover, the use of such complex transmitters and receivers in severe downhole conditions including extreme temperatures and pressures, severe mechanical shocks and vibrations (up to 650 G per millisecond) tends to reduce tool reliability.

Therefore, there exists a need for improved methods for determining a shear wave velocity of a subterranean formation that address one or more of the shortcomings described above. Such methods may, for example, be advantageous in analysis of acoustically slow formations. In particular, it will be appreciated that a method that is not dependent on isolating dipole or quadrupole waveforms (for example), in the transmission or reception thereof, would be highly advantageous, since many of the above stated disadvantages would thus be obviated.

SUMMARY OF THE INVENTION

The present invention addresses one or more of the above-described drawbacks of the prior art. Referring briefly to the accompanying figures, aspects of this invention include a method for determining a shear wave velocity (inversely related to slowness) of a subterranean formation. A multi-pole acoustic waveform is transmitted into a borehole and then received, for example, at an array of receivers longitudinally spaced from the transmitter. The received waveform(s) may be utilized to determine a borehole guided wave velocity. The measured borehole guided wave velocity may then be used to determine the formation shear wave velocity. For example in one embodiment, a mathematical model relating a theoretical borehole guided wave velocity to a theoretical formation shear wave velocity is derived. The mathematical model and the measured borehole guided wave velocity may then be processed to determine the shear wave velocity of the acoustically slow subterranean formation.

Exemplary embodiments of the present invention may advantageously provide several technical advantages. For example, exemplary methods of this invention utilize multipole acoustic transmitters and receivers and do not require any techniques (such as filtering or interference) to isolate, suppress or enhance any particular waveform modes. As such this invention tends to obviate the need for the complex transmitters and receivers of the prior art. Additionally, exemplary embodiments of this invention may obviate the need to apply complex waveform processing techniques such as backpropagating semblance. Exemplary embodiments of this invention may further advantageously improve the signal to noise ratio of downhole acoustic measurements and thereby improve the sensitivity and utility of such measurements.

In one aspect the present invention includes a method for determining a shear wave velocity of a subterranean formation. The method includes providing a downhole tool including at least one acoustic transmitter deployed at a first longitudinal position in a borehole and at least one acoustic receiver deployed at a second longitudinal position in the borehole. The method further includes propagating a multipole acoustic signal in the borehole using the acoustic transmitter and receiving an acoustic waveform from the multi-pole acoustic signal at the at least one receiver. The method still further includes processing the acoustic waveform to determine a borehole guided wave velocity and processing the borehole guided wave velocity to determine the shear wave velocity of the subterranean formation. In another aspect this invention includes a method for determining both a compressional wave and shear wave velocity of a subterranean formation.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
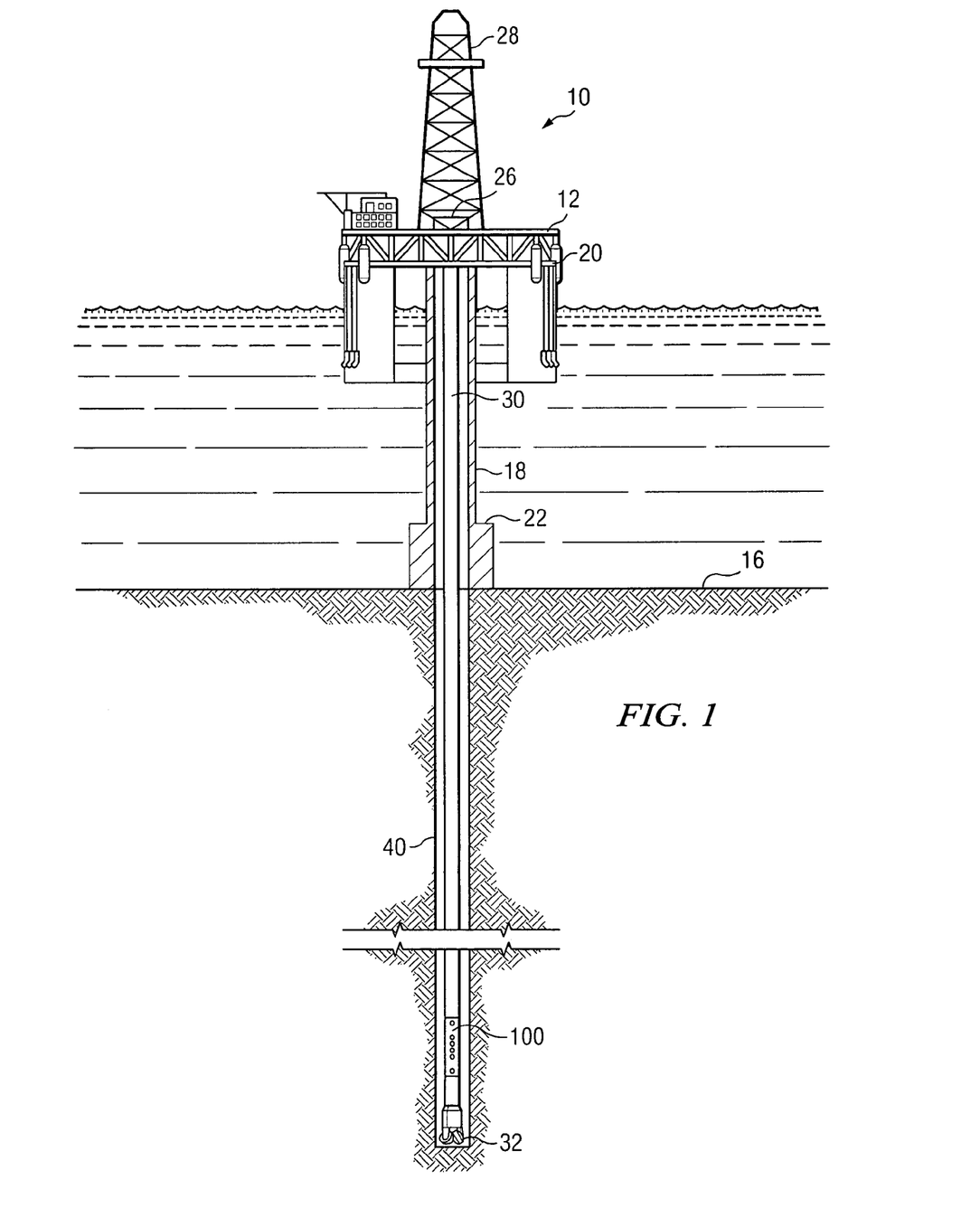
FIG. 1 is a schematic representation of an offshore oil and/or gas drilling platform utilizing an exemplary embodiment of the present invention.

FIG. 1 schematically illustrates one exemplary embodiment of an acoustic logging tool 100 according to this invention in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick 26 and a hoisting apparatus 28 for raising and lowering the drill string 30, which, as shown, extends into borehole 40 and includes a drill bit 32 and an acoustic logging tool 100. In the embodiment shown, and described in more detail with respect to FIG. 2, the acoustic logging tool 100 includes first and second transmitters 120 and 130 deployed about an array of longitudinally spaced receivers 140. Drill string 30 on FIG. 1 may further include a downhole drill motor, a mud pulse telemetry system, and one or more other sensors, such as a nuclear logging instruments and/or an acoustic caliper tool, for sensing downhole characteristics of the borehole and the surrounding formation.

It will be understood by those of ordinary skill in the art that the acoustic logging tool 100 of the present invention is not limited to use with a semisubmersible platform 12 as illustrated in FIG. 1. Acoustic logging tool 100 is equally well suited for use with any kind of subterranean drilling operation, either offshore or onshore.

Figure 2:
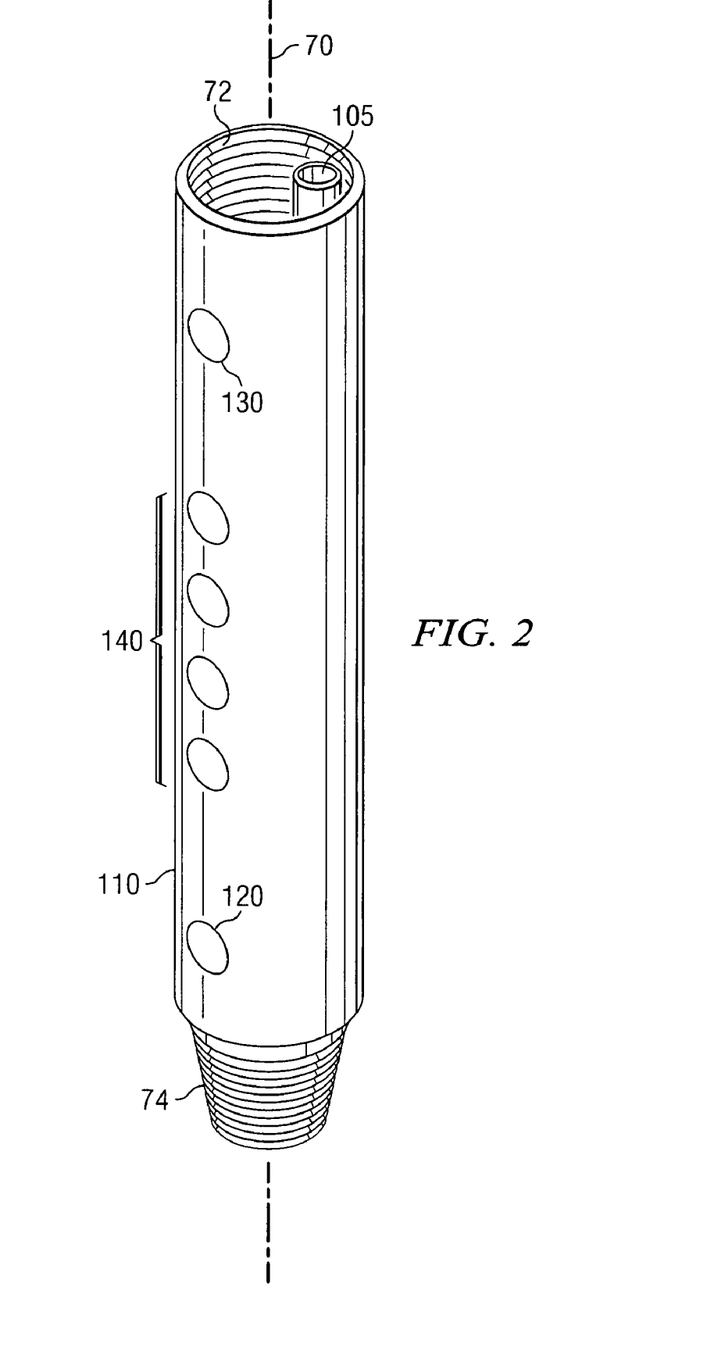
FIG. 2 depicts one exemplary MWD tool suitable for use in exemplary methods of this invention.

Referring now to FIG. 2, one exemplary embodiment of an acoustic logging tool 100 useful in conjunction with exemplary methods of the present invention is illustrated in perspective view. In FIG. 2, acoustic logging tool 100 is typically a substantially cylindrical tool, being largely symmetrical about cylindrical axis 70 (also referred to herein as a longitudinal axis). Acoustic logging tool 100 includes a substantially cylindrical tool collar 110 configured for coupling to a drill string (e.g., drill string 30 in FIG. 1) and therefore typically, but not necessarily, includes threaded end portions 72 and 74 for coupling to the drill string. Through pipe 105 provides a conduit for the flow of drilling fluid downhole, for example, to a drill bit assembly (e.g., drill bit 32 in FIG. 1). Acoustic logging tool 100 includes at least one, and preferably two (as shown) acoustic transmitters 120, 130 and an array of longitudinally spaced receivers 140 deployed thereon. It will be appreciated that while the embodiment shown includes two transmitters 120, 130 and a receiver array having four receivers 140, that this invention is not limited to any particular number of transmitters and receivers. It will also be appreciated that this invention is not limited to any particular layout (positioning) of the transmitter(s) and receiver(s) on the tool 100. For example, tool 100 may alternatively include radially opposing transmitters and receiver arrays.

Figure 3:
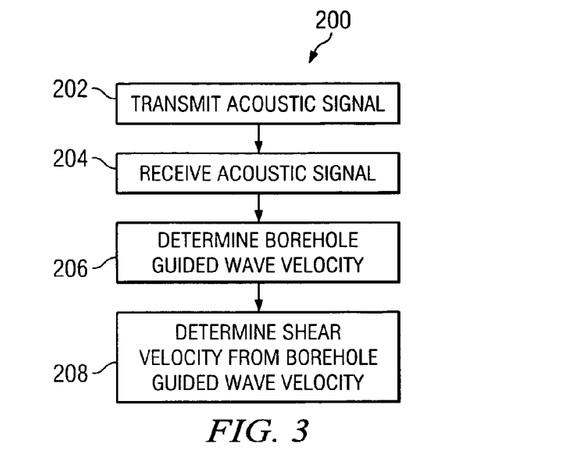
FIG. 3 depicts a flowchart of one exemplary method of this invention.

With reference now to FIG. 3, a flowchart 200 of one exemplary method for determining a shear wave velocity for acoustically slow formations is illustrated. Briefly, at 202 an acoustic transmitter, such as transmitter 120 in FIG. 2, is fired thereby propagating an acoustic waveform into a borehole. The dispersive waveform is received at 204 by one or more longitudinally spaced acoustic receivers, such as receiver(s) 140 in FIG. 2. A borehole guided wave velocity is determined at 206 utilizing the received waveform(s). At 208 a formation shear wave velocity is determined utilizing the borehole guided wave velocity determined in 206.

It will be appreciated that substantially any type of acoustic transmitter may be utilized to generate substantially any acoustic waveform. However, in preferred embodiments of this invention, the transmitter generates multi-pole acoustic waveforms. Where used herein, the term "multi-pole" refers to an acoustic signal including multiple azimuthal orders (i.e., multiple harmonics), in which no particular preselected azimuthal order (or combination thereof) has been designated for processing. For example, an acoustic signal including monopole (zeroeth order) and dipole (first order) components is considered a multi-pole signal as the term is used herein. Likewise, an acoustic signal including monopole, dipole, and quadrupole (second order) is also considered a multi-pole signal. In theory, a multi-pole transmitter excites acoustic signals of all orders (v=0, 1, 2, 3, . . . n). However, in practice, received multi-pole signals tend to be dominated by the lower order components (v=0, 1 or v=0, 1, 2), since the amplitude of the higher order signals tends to be approximately proportional to $1/v^2$. As used herein, monopole, dipole, and quadrupole waves may synonymously be referred to as either zeroeth, first, and second order waves or Stoneley, flexural, and screw waves, respectively.

The use of multi-pole acoustic signals advantageously obviates the need to generate acoustic signals having a substantially pure or a "pseudo" azimuthal order, for example, substantially pure or pseudo dipole waves or substantially pure or pseudo quadrupole waves as utilized in the prior art. As described above, the utilization of acoustic signals having a substantially pure or pseudo azimuthal order typically requires transmitters and receivers having significantly increased complexity (and therefore cost). Rather, it will be appreciated that pursuant to this invention, it is not necessary to isolate, suppress or enhance any particular azimuthal (harmonic) modes in either transmission or reception of the ultrasonic energy (waveforms). The waveform may be taken as it is received. For example, activities such as filtering, interference, or adding or subtracting of various waveforms from one transmitter or receiver with that of another, are not required. Likewise, it is not necessary to deploy transmitters or receivers having a particular geometry, or to ordain the timing of various components to transmit or receive substantially pure or pseudo monopole, dipole, or quadrupole waveforms. Rather as stated above, this invention utilizes multi-pole waveforms including multiple (at least two) azimuthal orders. Thus, exemplary methods of this invention may enable acoustic logging tools having relatively simple, inexpensive transmitters and receivers to be utilized.

While acoustic signals may be utilized having substantially any frequency band, in various exemplary embodiments of this invention, the transmitter advantageously emits acoustic energy having a center frequency in the range of from about 5 to about 9 kHz. In various preferred embodiments, the transmitter generates acoustic energy having a center frequency in the range from about 6 to about 8 kHz. Advantageous embodiments of this invention may also utilize a narrow band acoustic generator (transmitter). For example, in various exemplary embodiments, the transmitter may have a bandwidth of less than about 50% of its center frequency value (e.g., less than about 3 kHz). In other exemplary embodiments, the transmitter may have a bandwidth less than about 20% of its center frequency (e.g., less than about 1.2 kHz).

Use of a narrow band acoustic source having a center frequency in one of the above stated ranges may be particularly advantageous since in those frequency ranges the lower azimuthal order components (e.g., Stoneley, flexural, and screw waves) tend to travel down the borehole with approximately equal velocities. As such, the received waveforms often simply include a single borehole guided wave arrival (since the Stoneley, flexural, and screw waves have approximately equal velocities they tend to arrive at the receiver at approximately the same time). Waveform processing may be further advantageously simplified by the use of a narrowband transmitter in that a narrow frequency band obviates the need to apply complex waveform processing techniques to dispersive acoustic signals (e.g., backpropagating semblance which is disclosed in detail in U.S. Pat. No. 5,278,805 to Kimball). The use of a narrowband acoustic frequency also advantageously maximizes the energy of the acoustic signal in the frequency range of interest, thereby increasing the signal to noise ratio and reducing electrical power requirements (which tends to be a significant advantage in LWD applications). Further, the above stated frequency ranges are sufficiently high that drilling noise tends to be significantly reduced (thereby further increasing signal to noise).

The acoustic signal may be received using substantially any suitable acoustic receiver. In general only a single receiver is required. However, advantageous embodiments typically utilize a receiver array including a plurality of longitudinally spaced receivers (e.g., as shown in FIG. 2 in which four receivers 140 are longitudinally spaced along the tool body 110). Such receiver arrays advantageously provide significant additional information about the dispersive acoustic signal as it traverses the borehole. The received acoustic signal may also be filtered, e.g., with a pass band filter having a center frequency in the range of from about 6 to about 8 kHz and a bandwidth of less than about 1.2 kHz.

With continued reference to FIG. 3, upon receiving the acoustic signal at 204, the waveform(s) are typically evaluated to determine whether the formation is fast or slow. For example, received waveforms may be examined for a formation shear wave arrival. If such a formation shear wave arrival is present, then the formation is considered to be acoustically fast and the formation shear wave velocity (or slowness) may be determined directly from the shear wave arrival using waveform processing techniques know to those of ordinary skill in the art, such as semblance or phase velocity processing. The formation compressional velocity may likewise be determined from the compressional wave arrival and known waveform processing techniques.

For slow formations, in which there is no direct shear arrival, the borehole guided wave velocity may be determined from the borehole guided wave arrival (also referred to as the mud arrival) in the received waveform(s). As with the shear wave velocities for acoustically fast formations, the borehole guided wave velocity may be determined using substantially any suitable techniques such as semblance or phase velocity processing.

With continued reference to FIG. 3, determination of the formation shear wave velocity in 208 may be accomplished by processing a mathematical model that relates a theoretical formation shear wave velocity to a theoretical borehole guided wave velocity. Derivation of such theoretical models may be accomplished by solving appropriate wave equations, for example, for a cylindrical pipe (or rod) deployed in an infinite fluid filled cylinder (borehole). It will be appreciated that various mathematical models have been published in the prior art by several authors, including, for example, Cheng and Toksöz (in Geophysics, vol. 46(7), p. 1042–1053, 1981) and Schmidt (in Journal of the Acoustic Society of America, vol. 84(6), p. 2215–2229, 1988). Artisans of ordinary skill in this art will likewise be readily able to derive and compute solutions to such mathematical models.

Suitable mathematical models may be represented hypothetically as follows:

$$\hat{s}_{bh} = f(\hat{s}_{st}) \quad \text{Equation 1}$$

which indicates that the theoretical velocity of a borehole guided wave, $\hat{s}_{bh}$, is a mathematical function of a theoretical velocity of a formation shear wave, $\hat{s}_{st}$. As such, substitution of the measured velocity of a borehole guided wave (as determined in 206 of FIG. 3) into the mathematical model for the theoretical velocity of the borehole guided wave may enable the model equations to be solved for a velocity of a formation shear wave.

It will be appreciated that in embodiments utilizing a multi-pole acoustic source, such mathematical models may include distinct mathematical relationships for each harmonic component (i.e., $v=0, 1, 2, \ldots, n$). For example, in one exemplary embodiment in which monopole, dipole, and quadrupole borehole guided waves are considered, a mathematical model may be represented hypothetically as follows:

$$\hat{s}_{bh}(v=0) = f_0(\hat{s}_{st}) \quad \text{Equation 2}$$

$$\hat{s}_{bh}(v=1) = f_1(\hat{s}_{st}) \quad \text{Equation 3}$$

$$\hat{s}_{bh}(v=2) = f_2(\hat{s}_{st}) \quad \text{Equation 4}$$

where $\hat{s}_{bh}(v=0)$, $\hat{s}_{bh}(v=1)$, and $\hat{s}_{bh}(v=2)$ represent theoretical velocities for zeroeth, first, and second order (i.e., monopole, dipole, and quadrupole) borehole guided waves and $\hat{s}_{st}$, as described above, represents a velocity of a shear wave in the formation. The effects of higher order harmonics (e.g., $v=3, 4, \ldots, n$) may also be considered, however, in practice, as described above, the measured amplitude of such higher order harmonic signals tends to be insignificant (decreasing approximately proportionally to $1/v^2$).

The measured velocity of a borehole guided wave (as determined in 206 of FIG. 3) may be substituted into one or more of Equations 2 through 4 for the theoretical velocity of the borehole guided wave, $\hat{s}_{bh}$, and a solution for the velocity of the formation shear wave determined. For example, in one application, the first borehole guided wave arrival (or the only borehole guided wave arrival) in a received waveform may be assumed to include both monopole and dipole components (e.g., in a narrowband frequency range centered between about 5 and 9 kHz in which the monopole and dipole components tend to have substantially equal velocities). A velocity of the borehole guided wave may then be determined as described above and substituted into Equations 2 and 3, which are then solved, respectively, for first and second values of a formation shear wave velocity. The shear wave velocity of the formation may then be taken, for example, to be the average, or weighted average, of the first and second values determined from Equations 2 and 3, respectively.

Alternatively, the first borehole guided wave arrival in the received waveform may be assumed to include, monopole, dipole, and quadrupole components. The measured velocity of the borehole guided wave may then be substituted into Equations 2, 3, and 4 which may be solved for first, second, and third values of a formation shear wave velocity. The shear wave velocity of the formation may then be taken, for example, to be the average, or weighted average, of the first, second, and third values from Equations 2, 3 and 4, respectively.

In applications in which first and second borehole guided wave arrivals are detected in the received waveform, an alternative approach to determining a formation shear wave velocity may be desirable. In such applications, the first and second arrivals may be utilized to determine first and second borehole guided wave velocities of distinct harmonic components of the borehole guided wave. For example, in one approach, the first arrival (i.e., the early arrival) may be assumed to be a dipole component, while the second arrival (i.e., the later arrival) may be assumed to be a monopole component. In such an approach, the first borehole guided wave velocity may be substituted into Equation 3, while the second borehole guided wave velocity may be substituted into Equation 2, which may be solved for first and second values of a formation shear wave velocity. The shear wave velocity of the formation may then be taken, for example, to be an average, or a weighted average, of the first and second values determined from Equations 2 and 3, respectively.

In an alternative approach, the first arrival may be assumed to be a quadrupole component, while the second arrival may be assumed to include both monopole and dipole components traveling at approximately equal velocities. In such an approach, the first borehole guided wave velocity may be substituted into Equation 4. The second borehole guided wave velocity may be substituted into Equations 2 and 3. Equations 2, 3, and 4 may then be solved for first, second, and third values of a formation shear wave velocity. The shear wave velocity of the formation may then be taken, for example, to be an average, or a weighted average of the first, second, and third values determined from Equations 2, 3 and 4, respectively.

It will be appreciated that equations 1 through 4 may be solved (and a formation shear wave velocity determined) using substantially any known mathematical techniques. For example, such equations may be solved using commercial root finding algorithms. Alternatively, such equations may be solved using various software interpolation routines, such as those available in Mathematica® (Wolfram Research, Inc., Champaign, Ill.). In one exemplary embodiment of this invention an interpolation table is determined relating theoretical borehole guided wave velocities to theoretic shear wave velocities. For example, borehole guided wave velocities may be determined at five distinct theoretical shear wave velocities (e.g., theoretical shear wave slownesses 1.5, 1.8, 2.1, 2.4, and 2.7 times a compessional wave slowness). Such theoretical borehole guided wave velocities may then be compared to the measured value (e.g., determined in 206 of FIG. 3) and a shear wave velocity determined via interpolation (e.g., via Mathematica®).

It will be appreciated that mathematical relationships between the theoretical borehole guided wave velocity and the theoretical shear wave velocity may depend on one or more borehole and/or formation parameters (in addition to the azimuthal order of the acoustic signal). Such other parameters may include, for example, a frequency of the acoustic energy, a density of the drilling fluid, a velocity of a compressional wave in the drilling fluid, a local density of the formation, a velocity of a compressional wave in the formation, and a local diameter of the borehole. A mathematical model including the above parameters (and considering zeroeth, first, and second order harmonics) may be represented hypothetically as follows:

$$\hat{s}_{bh}(v=0)=f_0(\omega, \rho_m, s_{cm}, \rho_t, s_{ct}, d_h, \hat{s}_{st})$$  Equation 5

$$\hat{s}_{bh}(v=1)=f_1(\omega, \rho_m, s_{cm}, \rho_t, s_{ct}, d_h, \hat{e}_{st})$$  Equation 6

$$\hat{s}_{bh}(v=2)=f_2(\omega, \rho_m, s_{cm}, \rho_t, s_{ct}, d_h, \hat{s}_{st})$$  Equation 7 where $\omega$ represents a frequency of the acoustic waveform, $\rho_m$ represents a density of the drilling fluid (also referred to as drilling mud) in the borehole, $s_{cm}$ represents a velocity of a compressional wave in the drilling mud, $\rho_t$ represents a local density of the formation being drilled, $s_{ct}$ represents a velocity of a compressional wave in the formation, $d_h$ represents a local diameter of the borehole, and as described above, $\hat{s}_{bh}(v=0)$, $\hat{s}_{bh}(v=1)$, and $\hat{s}_{bh}(v2)$ represent theoretical velocities for zeroeth, first, and second order (i.e., monopole, dipole, and quadrupole) borehole guided waves and $\hat{s}_{st}$ represents a theoretical velocity of a shear wave in the formation.

A value for the frequency, $\omega$, of the acoustic energy may simply be taken, for example, as the center frequency of the acoustic transmitter (e.g., in the range of from about 5 to about 9 kHz in exemplary embodiments of this invention). In various exemplary embodiments a pass band filter may be applied to the received waveforms. In such embodiments, the center frequency of the pass band filter may be used for $\omega$. Alternatively, $\omega$ may be estimated by computing an instantaneous frequency of the received waveforms and averaging the instantaneous frequency over the portion of the waveform including borehole guided wave arrivals.

The density, $\rho_m$, of the drilling fluid may be determined from direct surface measurements. Such measured values may be suitable for many applications. More accurate estimates of $\rho_m$, may be obtained by correcting the surface measured values using downhole pressure and/or temperature measurements and known empirical or theoretical correlations.

The compressional wave velocity, $s_{cm}$, of the drilling fluid is typically dependent upon temperature, pressure, and drilling fluid composition. As such, $s_{cm}$ may, for example, be computed based on downhole temperature and/or pressure measurements. Alternatively, $s_{cm}$ may be estimated by determining formation shear wave velocities in acoustically fast regions of the borehole. Minimum values of the formation shear wave velocities (as determined in acoustically fast regions of the borehole) may be estimated to be equal to a compressional wave velocity of the drilling fluid.

The formation compressional wave velocity, $s_{ct}$, may be determined from the compression wave arrival in the received waveforms or from other acoustic measurements as described in greater detail herein.

The density, $\rho_t$, of the formation being drilled and the local diameter of the borehole, $d_h$, may preferably be measured using LWD measurement tools, such as spectral density measurement and acoustic caliper tools, respectively. For example, both $\rho_t$ and $d_h$ may be determined using the Density Neutron Standoff Caliper Multilink (DN-SCM™) tool available from Pathfinder Energy Services, Houston, Tex. Alternatively, if direct formation density measurements are not available, the formation density may be estimated from the formation compressional wave velocity, $s_{ct}$, using known correlative relationships such as the Gardener equations. In the absence of caliper measurements, the borehole diameter may alternatively be assumed to be equal to the diameter of the drill bit plus some allowance for borehole washout.

Figure 4:
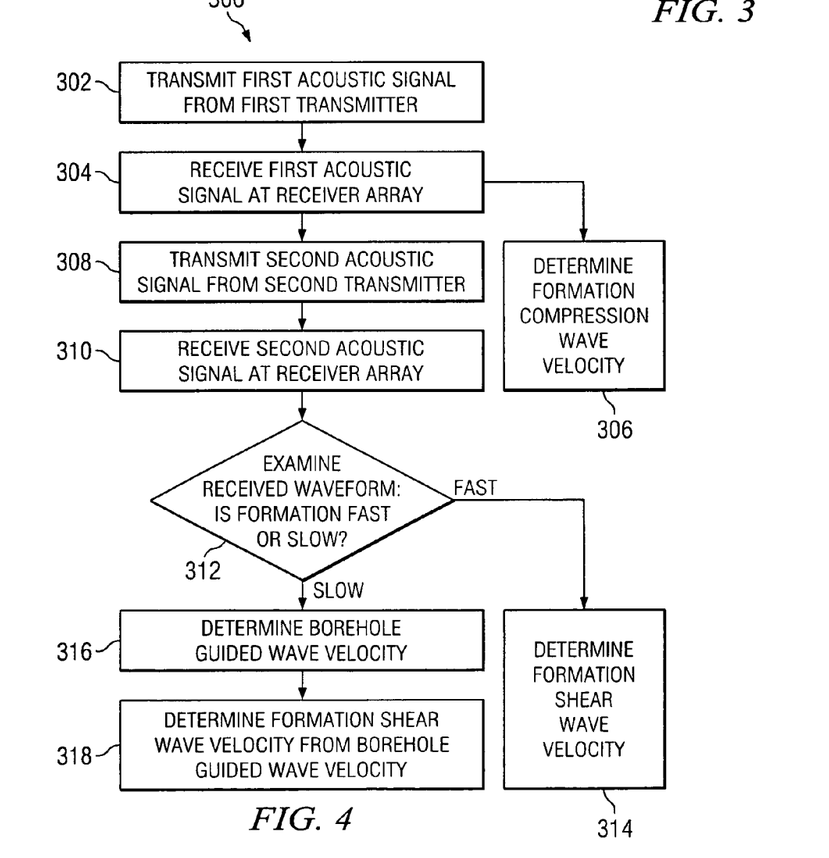
FIG. 4 depicts a flowchart of an alternative exemplary method of this invention.

With reference now to FIG. 4, a flowchart 300 of one preferred method of this invention is illustrated. At 302 a first acoustic signal is transmitted into the borehole using a first transmitter (e.g., transmitter 130 in FIG. 2). The first transmitter advantageously emits a narrowband acoustic signal having a center frequency in the range from about 12 to about 16 kHz. The first acoustic signal is then received 304 at a receiver array including a plurality of longitudinally spaced receivers (e.g., receivers 140 in FIG. 2). The received waveforms may then be utilized to determine a formation compressional wave velocity at 306, for example using semblance or phase velocity algorithms.

At 308 a second acoustic signal is transmitted from a second acoustic transmitter (e.g., transmitter 120 in FIG. 2). Waveforms from the second acoustic signal are then received at 310 at the receiver array (e.g., as shown in FIG. 2) and examined at 312 for formation shear arrivals to determine if the formation is acoustically fast or slow. If the waveforms include formation shear arrivals (i.e., if the formation is acoustically fast), then a formation shear wave velocity is determined in 314, for example, using known semblance or phase velocity algorithms. If the formation is acoustically slow (i.e., if it does not include direct formation shear wave arrivals), then a borehole guided wave velocity may be determined at 316. A formation shear wave velocity may then be determined at 318 from the borehole guided wave velocity determined in 316 as described above with respect to FIG. 3.

The following example is provided to illustrate, for example, exemplary advantages of the methodology of the present invention in determining shear slowness (inverse of velocity) values in acoustically slow subterranean formations.

Figure 5:
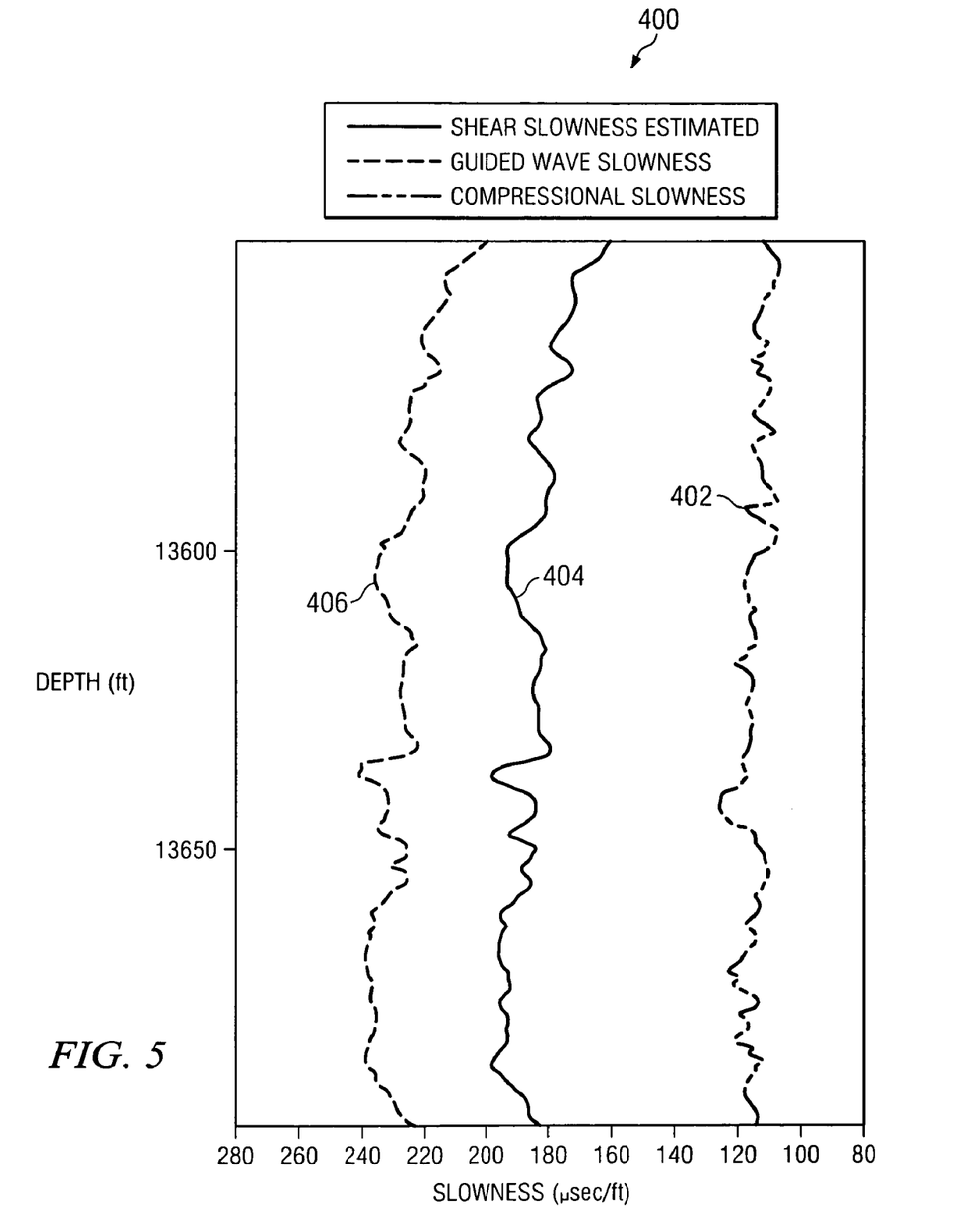
FIG. 5 illustrates an exemplary acoustic log generated using the exemplary method shown in FIG. 4 during an offshore drilling operation.

With reference now to FIG. 5, a portion of an exemplary acoustic log 400 acquired during an offshore LWD operation is shown. Compressional and shear wave slowness values (inversely proportional to velocities) were determined using the method described with respect to flowchart 300 shown on FIG. 4. The acoustic measurements were obtained using a downhole acoustic logging tool similar to that shown in FIG. 2. Compressional, shear, and borehole guided wave slowness values are shown as a function of measured depth at 402, 404, and 406, respectively.

It will be understood by those of ordinary skill in this art that exemplary embodiments of the invention may embody the disclosed equations, mathematics and transformation techniques, and equivalents thereof, on processor-readable logic embodied on a suitable storage device accessible by a processor. The processor may be, for example, included in hardware located downhole, or may alternatively be located in a computer at the surface. Alternatively the processor-readable logic may be embodied in software accessible to, and executable by, a processor such as just described in exemplary fashion. The invention is not limited in this regard.

Although the present invention and its advantages have been described in detail, it should be understood that various changes, substitutions and alternations can be made herein without departing from the spirit and scope of the invention as defined by the appended claims.

I claim:

1. A method for determining a shear wave velocity of a subterranean formation, the method comprising:
   (a) providing a downhole tool including at least one acoustic transmitter deployed at a first longitudinal position in a borehole and at least one acoustic receiver deployed at a second longitudinal position in the borehole;
   (b) propagating a multi-pole acoustic signal in the borehole using the acoustic transmitter;
   (c) receiving an acoustic waveform from the multi-pole acoustic signal at the at least one receiver;
   (d) processing the acoustic waveform to determine a borehole guided wave velocity; and
   (e) processing the borehole guided wave velocity to determine the shear wave velocity of the subterranean formation.

2. The method of claim 1, wherein the multi-pole acoustic signal includes at least two waveforms selected from the group consisting of monopole, dipole, and quadrupole waves.

3. The method of claim 1, wherein the multi-pole acoustic signal has a center frequency in a range selected from the group consisting of:
   (1) about 5 kHz to about 9 kHz.; and
   (2) about 6 kHz to about 8 kHz.

4. The method of claim 1, wherein the multi-pole acoustic signal has a bandwidth less than about 3 kHz.

5. The method of claim 1, wherein the multi-pole acoustic signal has a bandwidth less than about 1.2 kHz.

6. The method of claim 1, wherein the multi-pole acoustic signal has a center frequency in a range from about 6 kHz to about 8 kHz and a bandwidth less than about 1.2 kHz.

7. The method of claim 1, further comprising:
   (f) filtering the acoustic waveform with a band pass filter, the band pass filter having a center frequency in a range from about 6 kHz to about 8 kHz and a bandwidth less than about 1.2 kHz.

8. The method of claim 1, wherein (d) comprises using an algorithm selected from the group consisting of a semblance algorithm and a phase velocity processing algorithm.

9. The method of claim 1, wherein (e) comprises:
   processing a mathematical model to relate a theoretical shear wave velocity to a theoretical borehole guided wave velocity; and
   processing the mathematical model and the borehole guided wave velocity determined in (d) to determine the shear wave velocity of the subterranean formation.

10. The method of claim 9, wherein the mathematical model is derived by solving wave equations for a slowness of a theoretical borehole guided wave.

11. The method of claim 9, wherein the mathematical model is dependent upon an azimuthal order of a theoretical borehole guided wave.

12. The method of claim 11, wherein:
    theoretical shear wave velocities are determined for at least two of the azimuthal orders selected from the group consisting of monopole, dipole, and quadrupole waves; and
    the shear wave velocity of the subterranean formation is determined by processing said theoretical shear wave velocities.

13. The method of claim 11, wherein:
    theoretical shear wave velocities are determined for a first borehole guided wave arrival for at least one of the azimuthal orders selected from the group consisting of monopole, dipole, and quadrupole waves;
    theoretical shear wave velocities are determined for a second borehole guided wave arrival for at least one of the azimuthal orders selected from the group consisting of monopole, dipole, and quadrupole waves; and
    the shear wave velocity of the subterranean structure is determined by processing the theoretical shear wave velocities from the first and second borehole guided wave arrivals.

14. The method of claim 9, wherein the mathematical model is dependent on at least one parameter selected from the group consisting of:
    (1) a frequency of the multi-pole acoustic signal;
    (2) a density of the subterranean formation;
    (3) a density of a drilling fluid;
    (4) a compressional wave velocity of the subterranean formation;
    (5) a compressional wave velocity of the drilling fluid; and
    (6) a diameter of the borehole.

15. The method of claim 14, wherein the frequency of the multi-pole acoustic signal is a center frequency in a range from about 6 kHz to about 8 kHz.

16. The method of claim 14, wherein the density of the subterranean formation is measured downhole in substantially real time using a spectral density measurement tool.

17. The method of claim 14, further comprising drilling fluid in the borehole, wherein density of the drilling fluid is calculated based on a nominal density of the drilling fluid and downhole measurements of at least one of temperature and pressure of the drilling fluid.

18. The method of claim 14, wherein a compressional velocity of the subterranean formation is determined from the acoustic waveform received in (c).

19. The method of claim 14, further comprising drilling fluid in the borehole, wherein a compressional velocity of the drilling fluid is calculated based on a nominal compressional velocity of the drilling fluid and downhole measurements of at least one of temperature and pressure of the drilling fluid.

20. The method of claim 14, wherein the borehole diameter is measured using an acoustic caliper tool.

21. The method of claim 1, further comprising:
    (f) processing the multi-pole acoustic waveform to determine a compressional wave velocity of the subterranean formation.

22. A method for determining compressional wave and shear wave velocities of a subterranean formation, the method comprising:
    (a) providing a downhole tool including at least one transmitter deployed in the borehole, the downhole tool further including a receiver array having a plurality of receivers longitudinally spaced from the at least one transmitter;
    (b) propagating a first acoustic signal in the borehole using the at least one transmitter;
    (c) receiving a first set of waveforms from the first acoustic signal at the receiver array;
    (d) processing the first set of waveforms to determine the compressional wave velocity of the subterranean formation;
    (e) propagating a second acoustic signal in the borehole using the at least one acoustic transmitter, the second acoustic signal being a multi-pole acoustic signal;
    (f) receiving a second set of waveforms from the second acoustic signal at the receiver array;
    (g) processing the second set of waveforms to determine a borehole guided wave velocity; and (h) processing the borehole guided wave velocity and the compressional wave velocity of the subterranean formation to determine the shear wave velocity of the subterranean formation.

23. The method of claim 22, wherein the downhole tool includes first and second transmitters.

24. The method of claim 23, wherein:
the first acoustic signal is propagated in (b) by the first transmitter; and
the second acoustic signal is propagated in (e) by the second transmitter.

25. The method of claim 23, wherein the first and second transmitters are deployed at substantially the same longitudinal position on the downhole tool.

26. The method of claim 23, wherein the first and second transmitter are deployed at first and second longitudinal positions on the downhole tool.

27. The method of claim 22, wherein the first borehole guided wave has a center frequency in a range from about 12 kHz to about 16 kHz.

28. The method of claim 22, wherein the second borehole guided wave has a center frequency in a range from about 6 kHz to about 8 kHz and a bandwidth less than about 1.2 kHz.

29. The method of claim 22, wherein the second acoustic signal includes at least two waveforms selected from the group consisting of monopole, dipole, and quadrupole waves.

30. The method of claim 22, wherein (h) comprises:
processing a mathematical model to relate a theoretical shear wave velocity to a theoretical borehole guided wave velocity; and
processing the mathematical model, the borehole guided wave velocity determined in (g), and the compressional wave velocity determined in (d) to determine the shear wave velocity of the subterranean formation.

31. The method of claim 30, wherein the mathematical model is dependent upon an azimuthal order of a theoretical borehole guided wave.

32. A system for determining a shear wave velocity of a subterranean formation, the system comprising:
a down hole tool including an acoustic transmitter and at least one acoustic receiver, the tool operable to be positioned in a borehole such that the acoustic transmitter and the at least one acoustic receiver are located at corresponding first and second positions in the borehole; and
a processor configured to:
(A) instruct the transmitter to propagate a multi-pole acoustic signal into the borehole;
(B) instruct the at least one receiver to receive an acoustic waveform from the multi-pole acoustic acoustic signal;
(C) process the acoustic waveform to determine a borehole guided wave velocity; and
(D) process the borehole guided wave velocity to determine the shear wave velocity of the subterranean formation.

* * * * *